(12) United States Patent
Sadakata et al.

(10) Patent No.: US 11,624,412 B2
(45) Date of Patent: Apr. 11, 2023

(54) HYDRAULIC PRESSURE CONTROL DEVICE

(71) Applicant: Mazda Motor Corporation, Hiroshima (JP)

(72) Inventors: Kenta Sadakata, Aki-gun (JP); Tatsuhiro Minami, Aki-gun (JP); Hiroyuki Miyawaki, Aki-gun (JP); Yasuo Shigenaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 152 days.

(21) Appl. No.: 17/206,545

(22) Filed: Mar. 19, 2021

(65) Prior Publication Data

US 2021/0332861 A1    Oct. 28, 2021

(30) Foreign Application Priority Data

Apr. 27, 2020    (JP) .............................. JP2020-078304

(51) Int. Cl.
 *F16D 48/02*    (2006.01)

(52) U.S. Cl.
 CPC ...... *F16D 48/02* (2013.01); *F16D 2048/0221* (2013.01); *F16D 2500/1045* (2013.01);
 (Continued)

(58) Field of Classification Search
 CPC . F16D 2500/70418; F16D 2500/50808; F16D 2500/3024; F16D 2048/1045; F16D 48/02
 See application file for complete search history.

(56) References Cited

U.S. PATENT DOCUMENTS

2014/0033845 A1    2/2014    Kamada et al.
2017/0284485 A1*  10/2017    Tsunashima .......... F16D 48/064
(Continued)

FOREIGN PATENT DOCUMENTS

DE    102017001418 A1    8/2017
EP    2365232 A1    9/2011
(Continued)

OTHER PUBLICATIONS

European Patent Office, Extended European Search Report Issued in Application No. 21163099.1, Aug. 27, 2021, Germany, 8 pages.

*Primary Examiner* — Stacey A Fluhart
(74) *Attorney, Agent, or Firm* — Alleman Hall Creasman & Tuttle LLP

(57) ABSTRACT

The present invention is a hydraulic pressure control device for an automatic transmission that performs a gear shift by switching between engagement and disengagement of a plurality of friction engagement elements and includes solenoid valves, provided corresponding to the friction engagement elements, respectively, that switches between engagement and disengagement of the friction engagement elements by switching between supply and non-supply of hydraulic pressures to the friction engagement elements, and a control device that switches between supply and non-supply of the hydraulic pressures to the friction engagement elements by supplying a predetermined control current to the solenoid valves, in which the control device supplies a fixation preventing current lower than the control current to at least one of the solenoid valves corresponding to the friction engagement elements in a disengagement state of the plurality of friction engagement elements.

10 Claims, 7 Drawing Sheets

(52) U.S. Cl.
CPC ............... *F16D 2500/1085* (2013.01); *F16D 2500/3024* (2013.01); *F16D 2500/50808* (2013.01); *F16D 2500/70418* (2013.01)

(56) References Cited

U.S. PATENT DOCUMENTS

2019/0085908 A1* 3/2019 Janasek ............... F16D 25/0638
2020/0256406 A1* 8/2020 Jeong ..................... F16D 48/02

FOREIGN PATENT DOCUMENTS

JP          5761337 B2     8/2015
JP      2019190639 A     10/2019

\* cited by examiner

• TABLE OF CORRESPONDENCE BETWEEN CLUTCHES/BRAKES AND GEAR POSITIONS

|  | Rev. | 1 | 2 | 3 | 4 | 5 | 6 | 7 | 8 |
|---|---|---|---|---|---|---|---|---|---|
| CL1 | × | ○ | × | ○ | × | ○ | ○ | ○ | × |
| CL2 | × | × | ○ | ○ | ○ | × | ○ | × | ○ |
| CL3 | ○ | × | × | × | ○ | ○ | ○ | ○ | ○ |
| BR1 | ○ | ○ | ○ | × | × | × | × | ○ | ○ |
| BR2 | ○ | ○ | ○ | ○ | ○ | ○ | × | × | × |

○: ENGAGEMENT  ×: DISENGAGEMENT

FIG. 3

HYDRAULIC PRESSURE CONTROL DEVICE

TECHNICAL FIELD

The present invention relates to a hydraulic pressure control device and, more particularly, to a hydraulic pressure control device for an automatic transmission that performs a gear shift by switching between engagement and disengagement of a plurality of friction engagement elements.

BACKGROUND ART

Japanese Patent No. 5761337 (Patent Document 1) describes a method for controlling an automatic transmission, a control device for an automatic transmission, and an automatic transmission system. The automatic transmission described in Patent Document 1 has a plurality of friction engagement elements and can change the gear position by selectively engaging these friction engagement elements to change the power transfer path in the automatic transmission. That is, when changing the gear position from one to another, the automatic transmission releases some engaged friction engagement elements and engages other released friction engagement elements to change the power transfer path in the automatic transmission.

In general, at the time of a gear shift, the automatic transmission engages the friction engagement elements by operating the solenoid valves provided corresponding to the friction engagement elements to be engaged, moving the spools by these solenoid valves, and supplying hydraulic pressures to the friction engagement elements. In addition, the automatic transmission releases the friction engagement elements by operating the solenoid valves corresponding to the friction engagement elements to be released (disengaged) and stopping the supply of the hydraulic pressures to the friction engagement elements. At the time of a gear shift, the automatic transmission described in Patent Document 1 performs pre-charging so as to accurately match the operation timings of the solenoid valves corresponding to the friction engagement elements to be engaged and the friction engagement elements to be released.

PRIOR ART DOCUMENTS

Patent Documents

Patent Document 1: Japanese Patent No. 5761337

SUMMARY OF THE INVENTION

Problem to be Solved by the Invention

However, the spools to be moved by the solenoid valves corresponding to the friction engagement elements for switching in the automatic transmission may be fixed during the operation of an automatic transmission. When the spools are fixed as described above, the time before the solenoid valves are operated and the spools are actually moved is prolonged after control signals are sent to the solenoid valves, and the time before the hydraulic pressures are actually supplied to the friction engagement elements to be engaged is prolonged. When the spools are fixed as described above, even if pre-charging is performed as in the invention described in Patent Document 1, the engagement of the friction engagement elements is delayed, thereby degrading the responsiveness of a gear shift by the automatic transmission.

Accordingly, an object of the present invention is to provide a hydraulic pressure control device for an automatic transmission capable of suppressing reduction in responsiveness due to a delay in the supply of hydraulic pressures.

Means for Solving the Problem

To solve the problem described above, there is provided a hydraulic pressure control device for an automatic transmission that performs a gear shift by switching between engagement and disengagement of a plurality of friction engagement elements, the hydraulic pressure control device including a plurality of solenoid valves configured to switch between engagement and disengagement of the friction engagement elements by switching between supply and non-supply of hydraulic pressures to the friction engagement elements, the solenoid valves being provided corresponding to the friction engagement elements, respectively; and a control device configured to switch between supply and non-supply of the hydraulic pressures to the friction engagement elements by supplying a predetermined control current to the solenoid valves, in which the control device supplies a fixation preventing current lower than the control current to at least one of the solenoid valves in a disengagement state of the friction engagement elements.

In the present invention configured as described above, the control device supplies a predetermined control current to the solenoid valves. The solenoid valves are provided for the friction engagement elements of the automatic transmission, respectively, and switch between engagement and disengagement of the friction engagement elements based on the control current from the control device by switching between supply and non-supply of the hydraulic pressures to the friction engagement elements. In addition, the control device supplies the fixation preventing current lower than the control current to at least one of the solenoid valves corresponding to the friction engagement elements in the disengagement state.

The inventors of the present invention have found that the occurrence of a delay in the supply of the hydraulic pressures to the friction engagement elements to be engaged is caused by the fixation of the components driven by the solenoid valves and the occurrence of this fixation can be suppressed by supplying the fixation preventing current to the solenoid valve. That is, the inventors of the present invention have found that some friction engagement elements of the plurality of friction engagement elements provided in the automatic transmission are kept in the disengagement state for a long time, thereby causing the fixation. According to the present invention configured as above, the control device suppresses the occurrence of the fixation by supplying the fixation preventing current lower than the control current to at least one of the solenoid valves corresponding to the friction engagement elements in the disengagement state. That is, when the fixation preventing current lower than the control current is supplied to the solenoid valves, hydraulic pressures are generated in the friction engagement elements provided so as to correspond to the solenoid valves. However, since the fixation preventing current is less than the control current, the hydraulic pressures generated in the corresponding friction engagement elements are small, the friction engagement elements are not engaged and the disengagement state is maintained. In contrast, since a small amount of hydraulic oil flows through the hydraulic supply systems of the solenoid valves to which the fixation preventing current is supplied, the fixation of the components moved by the solenoid valves is suppressed and the occurrence of the delay in the supply of the hydraulic pressures can be suppressed.

In the present invention, preferably, at least one of the solenoid valves switches at least one of the friction engagement elements to an engagement state when receiving the control current.

According to the present invention configured as described above, when the at least one of the solenoid valves is supplied with the control current, the at least one of the friction engagement elements are supplied with the hydraulic pressures and switched to the engagement state, so the at least one of the friction engagement elements can be switched to the disengagement state without supplying the current to the solenoid valves, thereby reducing the current consumption. In addition, it is sufficient to pass a small current slightly higher than zero as the fixation preventing current, so the amount of current consumed to suppress fixation can be reduced.

In the present invention, preferably, at least one of the friction engagement elements is at least one zero touch clutch in which a clearance between friction plates constituting each of the friction engagement elements is substantially zero, and the control device does not supply the fixation preventing current to at least one of the solenoid valves corresponding to the at least one zero touch clutch even when the at least one zero touch clutch is in the disengagement state.

Since the clearance between the friction plates is set to substantially zero in the at least one zero touch clutch, even a small hydraulic pressure may engage the at least one zero touch clutch. According to the present invention configured as described above, since the at least one of the solenoid valves corresponding to the at least one zero touch clutch is not supplied with the fixation preventing current, malfunction of the at least one zero touch clutch due to the fixation preventing current can be prevented.

In the present invention, preferably, the control device supplies the hydraulic pressures to the at least one zero touch clutch by switching the solenoid valves corresponding to the at least one zero touch clutch when a vehicle equipped with the automatic transmission starts, and the at least one zero touch clutch is always switched to the engagement state at a gear position equal to or lower than a predetermined gear position of the automatic transmission.

According to the present invention configured as described above, since the at least one zero touch clutch is supplied with the hydraulic pressures when the vehicle starts to engage the zero touch clutch, the starting responsiveness of the vehicle can be improved. On the other hand, in the automatic transmission, the friction engagement elements that are engaged only at a high gear position may remain disengaged for a long time, while the friction engagement elements that are engaged at a low gear position seldom remain disengaged for a long time during a normal travel. In the present invention configured as described above, since the zero touch clutch is always engaged at a gear position equal to or lower than the predetermined gear position of the automatic transmission, the zero touch clutch seldom remains disengaged for a long time during a normal travel and the occurrence of fixation can be suppressed even if the fixation preventing current is not supplied to the solenoid valves corresponding to the zero touch clutch.

In the present invention, preferably, when it is determined that the friction engagement elements are engaged in the gear position after switching, the supply of the control current to the friction engagement elements is started. When it is determined that the friction engagement elements are disengaged in the gear position after switching, the supply of the fixation preventing current to the friction engagement elements is started.

In the present invention, preferably, when it is determined that no switching instruction is present, it is determined whether the friction engagement elements are being engaged, and whether the friction engagement elements are being engaged is determined based on the detection signal from an engagement hydraulic pressure sensor. When it is determined that the friction engagement elements are engaged, the supply of the predetermined control current for engaging the friction engagement elements is maintained. When it is determined that the friction engagement elements are not engaged, the control current for engaging the friction engagement elements is not supplied, the supply of the fixation preventing current to the engagement hydraulic pressure control valve is maintained.

Advantage of the Invention

The hydraulic pressure control device for an automatic transmission according to the present invention can suppress reduction in the responsiveness due to a delay in the supply of the hydraulic pressure.

BRIEF DESCRIPTION OF THE DRAWINGS

FIG. 3 is a table of correspondence between clutches/brakes and gear positions in the automatic transmission in which gear positions are switched by the hydraulic pressure control device according to the embodiment of the present invention.

MODES FOR CARRYING OUT THE INVENTION

Next, a hydraulic pressure control device for an automatic transmission according to an embodiment of the present invention will be described with reference to the attached drawings.

Figure 1:
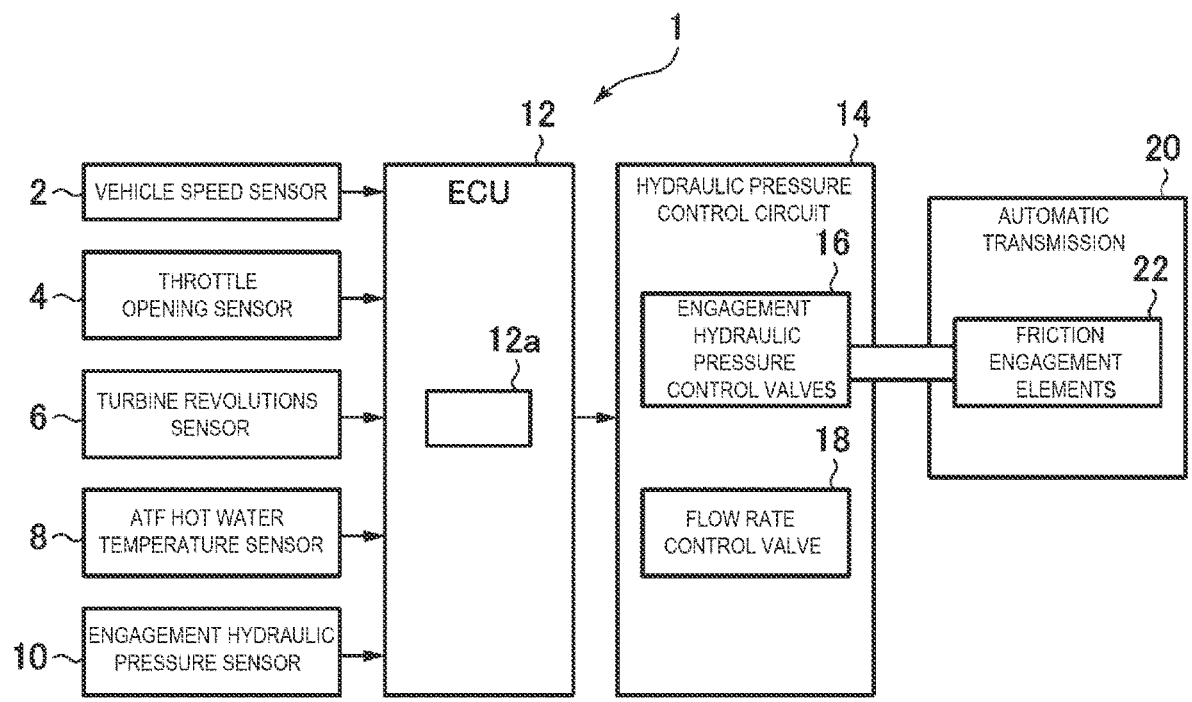
FIG. 1 is a block diagram illustrating an overall automatic transmission system having a hydraulic pressure control device according to an embodiment of the present invention.
Figure 2:
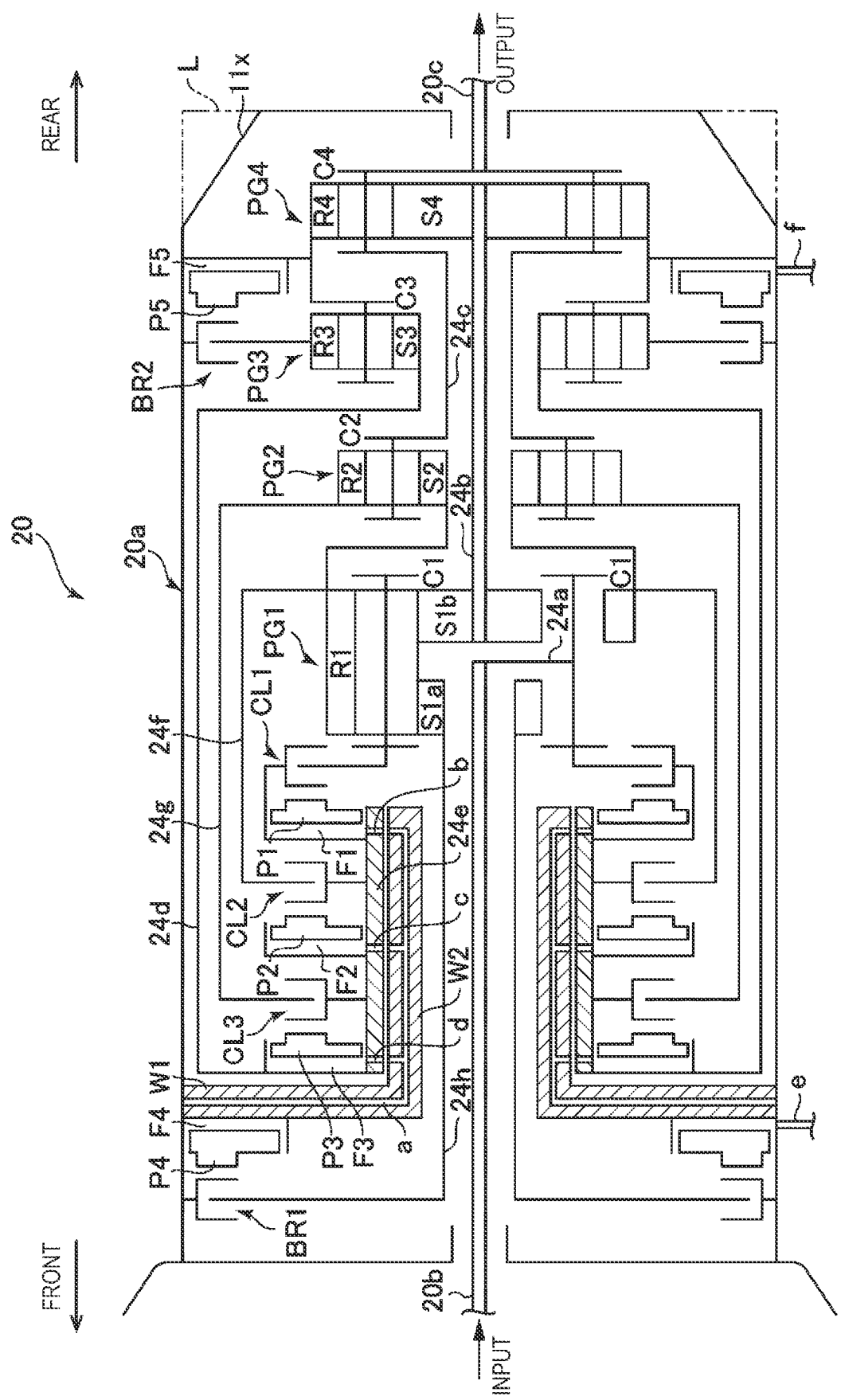
FIG. 2 is a diagram illustrating the schematic structure of an automatic transmission that switches gear positions via the hydraulic pressure control device according to the embodiment of the present invention.
Figure 4:
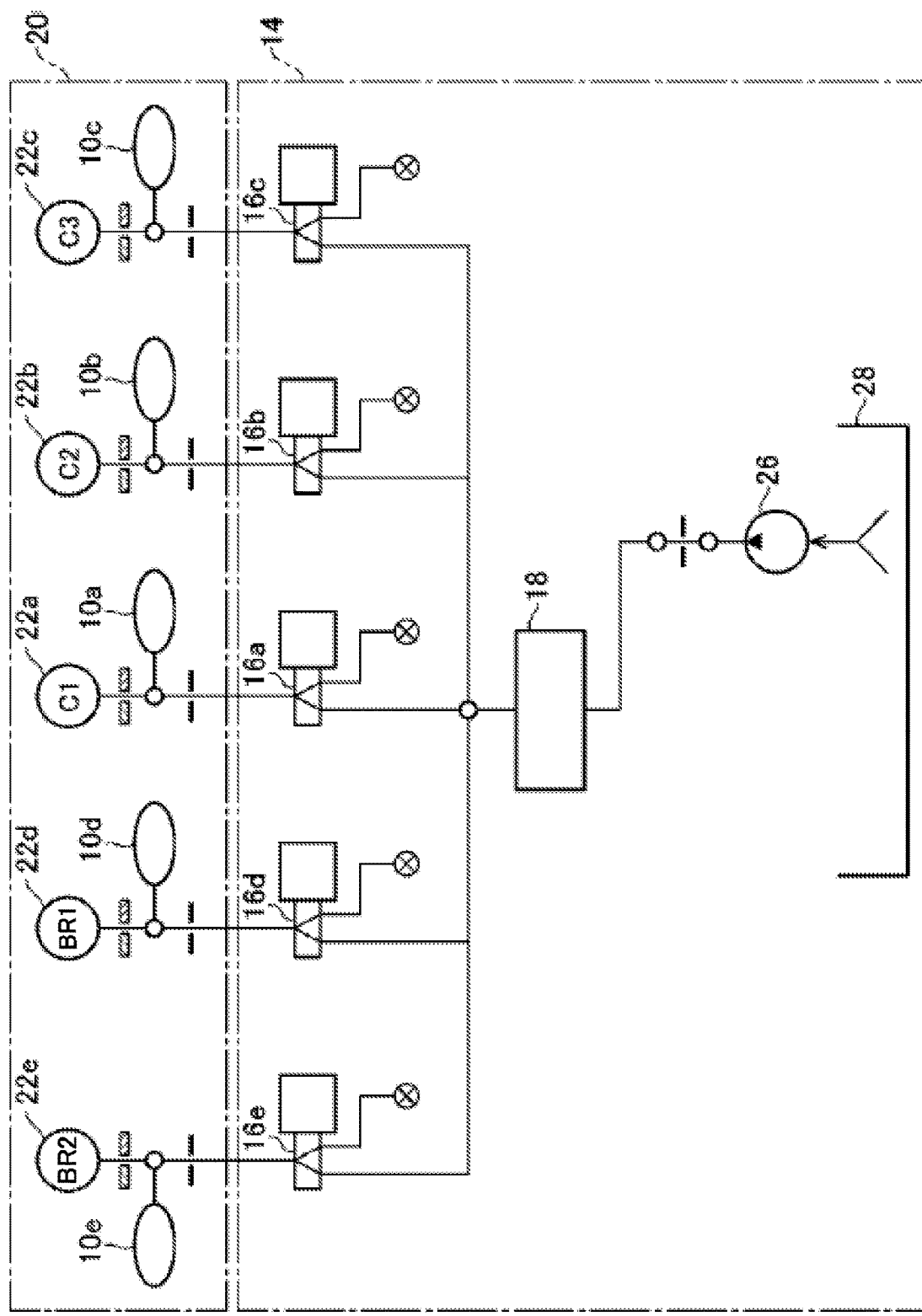
FIG. 4 is a diagram illustrating a hydraulic pressure control circuit provided in the hydraulic pressure control device according to the embodiment of the present invention.

FIG. 1 is a block diagram illustrating an overall automatic transmission system having a hydraulic pressure control device according to the embodiment of the present invention. FIG. 2 is a diagram illustrating the schematic structure of the automatic transmission that switches gear positions via the hydraulic pressure control device according to the embodiment of the present invention. FIG. 3 is a table of the correspondence between clutches/brakes and gear positions in the automatic transmission in which gear positions are switched by the hydraulic pressure control device according to the embodiment of the present invention. FIG. 4 is a diagram illustrating a hydraulic pressure control circuit provided in the hydraulic pressure control device according to the embodiment of the present invention.

As illustrated in FIG. 1, an automatic transmission system 1 equipped with the hydraulic pressure control device according to the embodiment of the present invention includes a vehicle speed sensor 2, a throttle opening sensor 4, a turbine revolutions sensor 6, an ATF hot water temperature sensor 8, and an engagement hydraulic pressure sensor 10. The automatic transmission system 1 further includes an electronic control unit (ECU) 12 to which signals from the sensors described above are input, a hydraulic pressure control circuit 14 controlled by the control signals from the ECU 12, and an automatic transmission 20 in which the gear position is switched by the hydraulic pressure supplied by this hydraulic pressure control circuit 14.

The vehicle speed sensor 2 detects the vehicle speed of a vehicle (not illustrated) equipped with the automatic transmission system 1 and inputs the detection signal to the ECU 12.

The throttle opening sensor 4 detects the throttle opening of the engine (not illustrated) of a vehicle (not illustrated) equipped with the automatic transmission system 1 and inputs the detection signal to the ECU 12.

The turbine revolutions sensor 6 detects the number of revolutions of the turbine of a turbocharger (not illustrated) provided in the engine of the vehicle equipped with the automatic transmission system 1 and inputs the detection signal to the ECU 12.

The ATF hot water temperature sensor 8 detects the temperature of the hydraulic oil (automatic transmission fluid) for the hydraulic pressure to be supplied to the automatic transmission 20 and inputs the detection signal to the ECU 12.

The engagement hydraulic pressure sensor 10 detects the temperature of the hydraulic oil to be supplied to friction engagement elements 22 of the automatic transmission 20 via the hydraulic pressure control circuit 14 and inputs the detection signal to the ECU 12. As described later, the automatic transmission 20 has the plurality of friction engagement elements 22 and the plurality of engagement hydraulic pressure sensors 10 that correspond to these friction engagement elements 22. The pressures of the hydraulic oil supplied to the friction engagement elements 22 are detected by the engagement hydraulic pressure sensors 10 provided so as to correspond to the friction engagement elements 22 and the detection signals are input to the ECU 12.

The ECU (electronic control unit) 12 controls the engine (not illustrated), the automatic transmission 20, and the like of the vehicle based on the detection signals input from the sensors. Specifically, the ECU 12 calculates the appropriate gear position of the automatic transmission 20 based on the detection signals detected by the vehicle speed sensor 2, the throttle opening sensor 4, and the turbine revolutions sensor 6 and controls the automatic transmission 20 based on this gear position. That is, after calculating the appropriate gear position, the ECU 12 switches between the engagement and disengagement of the friction engagement elements 22 provided in the automatic transmission 20 so as to achieve the gear position. In addition, switching between engagement and disengagement of the friction engagement elements 22 is performed by supply or non-supply of the hydraulic pressures to the friction engagement elements 22. Accordingly, the ECU 12 switches between engagement and disengagement of the friction engagement elements 22 by controlling engagement hydraulic pressure control valves 16 and a flow rate control valve 18 provided in the hydraulic pressure control circuit 14. It should be noted here that, in the embodiment, the automatic transmission 20 includes first to fifth friction engagement elements 22a to 22e and first to fifth engagement hydraulic pressure control valves 16a to 16e provided corresponding to the friction engagement elements 22a to 22e, as described later with reference to FIG. 4. In the following description, the first to fifth engagement hydraulic pressure control valves 16a to 16e are collectively referred to simply as the engagement hydraulic pressure control valves 16 and the first to fifth friction engagement elements 22a to 22e are collectively referred to simply as the friction engagement elements 22.

That is, the engagement hydraulic pressure control valves 16 are provided corresponding to the friction engagement elements 22 provided in the automatic transmission 20 and the ECU 12 switches between engagement and disengagement by controlling the engagement hydraulic pressure control valves 16 corresponding to the friction engagement element 22 to be switched. Here, the ECU 12 includes a microprocessor, various interface circuits, memory, software (these are not illustrated) for operating these components, and the like. A part of the circuit of the ECU 12 configured as described above functions as a control device 12a that switches between supply and non-supply of the hydraulic pressures to the friction engagement elements 22 by supplying a predetermined control current to the solenoid valves of the engagement hydraulic pressure control valves 16. In addition, the solenoid valves provided in the engagement hydraulic pressure control valves 16 and the control device 12a function as the hydraulic pressure control device according to the embodiment of the present invention. It should be noted here that the control device 12a may be configured as a hardware component separate from the ECU 12 that controls the engine (not illustrated) of the vehicle.

Next, the structure of the automatic transmission that switches the gear position via the hydraulic pressure control device according to the embodiment of the present invention will be described with reference to FIGS. 2 and 3.

In the embodiment, the automatic transmission 20 is a longitudinally mounted automatic transmission installed in a vehicle such as a front-wheel, rear-drive (FR) vehicle. As illustrated in FIG. 2, the automatic transmission 20 includes a transmission case 20a, an input shaft 20b inserted into the inside of the transmission case 20a from the vehicle drive source (left side in the figure), and an output shaft 20c that projects to the side opposite to the drive source side (right side in the figure) from the inside of the transmission case 20a. The input shaft 20b and the output shaft 20c are disposed coaxially in the front and rear direction of the vehicle and the automatic transmission 20 is disposed with a longitudinal attitude in which the input shaft 20b is located on the front side of the vehicle and the output shaft 20c is located on the rear side of the vehicle. Accordingly, in the following description, the drive source side (left side in the figure) may be referred to as the front side and the side opposite to the source side (right side in the figure) may be referred to as the rear side.

First, second, third, and fourth planetary gear sets (referred to below simply as the "gear sets") PG1, PG2, PG3, and PG4 are disposed in the order from the front side (drive source side) coaxially with the input shaft 20b and the output shaft 20c.

In the transmission case 20a, a first clutch CL1 is disposed on the front side of the first gear set PG1, a second clutch CL2 is disposed on the front side of the first clutch CL1, and a third clutch CL3 is disposed on the front side of the second clutch CL2. In addition, a first brake BR1 is disposed on the front side of the third clutch CL3 and a second brake BR2 is disposed on the outer side in the radial direction of the third gear set PG3. As described above, the friction engagement elements (the first to third clutches CL1 to CL3 and the first and second brakes BR1 and BR2) of the automatic transmission 20 are disposed in the shaft direction from the front side (drive source side) in the order of the first brake BR1, the third clutch CL3, the second clutch CL2, the first clutch CL1, and the second brake BR2.

The first to fourth gear sets PG1 to PG4 are of a single pinion type in which pinions supported by a carrier are engaged directly with a sun gear and a ring gear. The first gear set PG1 has a first sun gear (e.g., S1a and/or S1b described below), a first ring gear R1, and a first carrier C1 as rotating elements. The second gear set PG2 has a second sun gear S2, a second ring gear R2, and a second carrier C2 as rotating elements. The third gear set PG3 has a third sun gear S3, a third ring gear R3, and a third carrier C3 as rotating elements. The fourth gear set PG4 has a fourth sun gear S4, a fourth ring gear R4, and a fourth carrier C4 as rotating elements.

The first gear set PG1 is of double sun gear type in which the first sun gear is divided into two in the shaft direction. That is, the first sun gear has a front side first sun gear S1a disposed on the front side in the shaft direction and a rear side first sun gear S1b disposed on the rear side. Since the pair of front and rear first sun gears S1a and S1b has the same number of teeth and are engaged with the same pinion supported by the first carrier C1, the number of revolutions of these front and rear first sun gears S1a and S1b are always the same. That is, the pair of front and rear first sun gears S1a and S1b always rotates at the same number of revolutions and, when one of the front and rear first sun gears stops rotating, the other of the front and rear first sun gears also stops rotating.

In this automatic transmission 20, the first sun gear (more specifically, the rear side first sun gear S1b) and the fourth sun gear S4 are always coupled to each other, the first ring gear R1 and the second sun gear S2 are always coupled to each other, the second carrier C2 and the fourth carrier C4 are always coupled to each other, and the third carrier C3 and the fourth ring gear R4 are always coupled to each other. The input shaft 20b is always coupled to the first carrier C1 and the output shaft 20c is always coupled to the fourth carrier C4. Specifically, the input shaft 20b is coupled to the first carrier C1 via a power transfer member 24a that passes between the pair of front and rear first sun gears S1a and S1b. The rear side first sun gear S1b and the fourth sun gear S4 are coupled to each other via a power transfer member 24b. The fourth carrier C4 and the second carrier C2 are coupled to each other via a power transfer member 24c.

The first clutch CL1 engages or disengages the input shaft 20b and the first carrier C1 with or from the third sun gear S3. The second clutch CL2 engages and disengages the first ring gear R1 and the second sun gear S2 with or from the third sun gear S3. The third clutch CL3 engages and disengages the second ring gear R2 with or from the third sun gear S3.

Specifically, the first clutch CL1 has a rotatable inner holding member coupled to the first carrier C1, a hub side friction plate engaged with the outer peripheral surface of the inner holding member, a rotatable outer holding member coupled to the third sun gear S3 via power transfer members 24d and 24e, a drum side friction plate engaged to the inner peripheral surface of the outer holding member, and a piston P1 driven forward and backward in the shaft direction for press-connection between the hub side friction plate and the drum side friction plate. A hydraulic chamber F1 into which the hydraulic pressure supplied from the hydraulic pressure control circuit 14 is introduced is defined at the adjacent position of the piston P1, and press-connection between the hub side friction plate and the drum side friction plate is performed or released depending on whether the hydraulic pressure is supplied to or discharged from the hydraulic chamber F1. Then, depending on press-connection or release of press-connection, the inner holding member is coupled to or separated from the outer holding member, and the input shaft 20b and the first carrier C1 are engaged with or disengaged from the third sun gear S3 accordingly.

The second clutch CL2 has a rotatable inner holding member coupled to the third sun gear S3 via the power transfer members 24d and 24e, a hub side friction plate engaged with the outer peripheral surface of the inner holding member, a rotatable outer holding member coupled to the first ring gear R1 and the second sun gear S2 via a power transfer member 24f, a drum side friction plate engaged with the inner peripheral surface of the outer side holding member, and a piston P2 driven forward and backward in the shaft direction for press-connection between the hub side friction plate and the drum side friction plate. A hydraulic chamber F2 into which the hydraulic pressure supplied from the hydraulic pressure control circuit 14 is introduced is defined at the adjacent position of the piston P2, and the first ring gear R1 and the second sun gear S2 are engaged with or disengaged from the third sun gear S3 by performing or releasing press-connection between the hub side friction plate and the drum side friction plate depending on whether the hydraulic pressure is supplied to or discharged from the hydraulic chamber F2.

The third clutch CL3 has a rotatable inner holding member coupled to the third sun gear S3 via the power transfer members 24d and 24e, a hub side friction plate engaged with the outer peripheral surface of the inner holding member, a rotatable outer holding member connected to the second ring gear R2 via a power transfer member 24g, a drum side friction plate engaged with the inner peripheral surface of the outer holding member, and a piston P3 driven forward and backward in the shaft direction for press-connection between the hub side friction plate and the drum side friction plate. A hydraulic chamber F3 into which the hydraulic pressure supplied from the hydraulic pressure control circuit 14 is introduced is defined at the adjacent position of the piston P3, and the second ring gear R2 is engaged with or disengaged from the third sun gear S3 by performing or releasing press-connection between the hub side friction plate and the drum side friction plate depending on whether the hydraulic pressure is supplied to or discharged from the hydraulic chamber F3.

The first brake BR1 engages or disengages the transmission case 20a with or from the first sun gear (more specifically, the front side first sun gear S1a). The second brake BR2 engages or disengages the transmission case 20a with or from the third ring gear R3.

Specifically, the first brake BR1 has a rotary inner holding member coupled to the front side first sun gear S1a via a power transfer member 24h, a hub side friction plate engaged with the outer peripheral surface of the inner holding member, a non-rotatable outer holding member coupled to the transmission case 20a, a drum side friction plate engaged with the inner peripheral surface of the outer holding member, and a piston P4 driven forward and backward in the shaft direction for press-connection between the hub side friction plate and the drum side friction plate. A hydraulic chamber F4 into which the hydraulic pressure supplied from the hydraulic pressure control circuit 14 is introduced is defined at the adjacent position of the piston P4, and the transmission case 20a is engaged with or disengaged from the first sun gear S1 by performing or releasing press-connection between the hub side friction plate and the drum side friction plate depending on whether the hydraulic pressure is supplied to or discharged from the hydraulic chamber F4.

The second brake BR2 has a rotatable inner holding member coupled to the third ring gear R3, a hub side friction plate engaged with the outer peripheral surface of the inner holding member, a non-rotatable outer holding member coupled to the transmission case 20a, a drum side friction plate engaged with the inner peripheral surface of the outer holding member, and a piston P5 driven forward and backward in the shaft direction for press-connection between the hub side friction plate and the drum side friction plate. A hydraulic chamber F5 into which the hydraulic pressure supplied from the hydraulic pressure control circuit 14 is introduced is defined at the adjacent position of the piston P5, and the transmission case 20a is engaged with or disengaged from the third ring gear R3 by performing or releasing press-connection between the hub side friction plate and the drum side friction plate depending on whether the hydraulic pressure is supplied to or discharged from the hydraulic chamber F5.

The transmission case 20a has a vertical wall portion W1 with an annular shape extending radially inward from the inner peripheral surface of the transmission case 20a at a position in the shaft direction between the first brake BR1 and the third clutch CL3, and a cylindrical wall portion W2 with a cylindrical shape extending backward from the inner peripheral end of the vertical wall portion W1. The cylindrical wall portion W2 is formed so as to extend concentrically along the inner peripheral surface of the power transfer member 24e.

Three housings arranged in the shaft direction are formed radially outward of the power transfer member 24e, and the pistons P1, P2, and P3 of the first clutch CL1, the second clutch CL2, and the third clutch CL3 are housed in these three housings, respectively.

The vertical wall portion W1, the cylindrical wall portion W2, and the power transfer member 24e are provided with oil channels through which the hydraulic pressures are supplied to the hydraulic chambers F1, F2, and F3 of the first clutch CL1, the second clutch CL2, and the third clutch CL3, respectively. Specifically, an oil channel a is formed in the vertical wall portion W1 and the cylindrical wall portion W2 and oil channels b, c, and d are formed in the power transfer member 24e. Then, the hydraulic pressure is supplied to the hydraulic chamber F1 of the first clutch CL1 through the oil channel a and the oil channel b, the hydraulic pressure is supplied to the hydraulic chamber F2 of the second clutch CL2 through the oil channel a and the oil channel c, and the hydraulic pressure is supplied to the hydraulic chamber F3 of the third clutch CL3 through the oil channel a and the oil channel d.

Although not illustrated, the communication portions between the oil channel a and the oil channels b, c, and d between the outer peripheral surface of the cylindrical wall portion W2 and the inner peripheral surface of the power transfer member 24e are sealed by seal rings, respectively.

The piston P4 of the first brake BR1 is housed in the housing formed on the front side of the vertical wall portion W1. An oil channel e directly communicates with the hydraulic chamber F4 partitioned by this housing, from the outside of the transmission case 20a.

The piston P5 of the second brake BR2 is housed in the housing fitted to the inner peripheral surface of the rear portion of the transmission case 20a. An oil channel f directly communicates with the hydraulic chamber F5 partitioned by this housing, from the outside of the transmission case 20a.

As illustrated in the engagement table in FIG. 3, the automatic transmission 20 with the structure described above forms one of the first to eighth forward speeds and the reverse speed by selectively engaging three specific friction engagement elements among the five friction engagement elements (CL1, CL2, CL3, BR1, and BR2) based on supply and discharge control of the hydraulic chambers F1 to F5.

In addition, in the embodiment, the second brake BR2 of the automatic transmission 20 is configured as a "zero touch clutch." In the present specification, the "zero touch clutch" means a clutch or a brake in which the friction plates (driving plate and driven plate) constituting the second brake BR2, which is a friction engagement element, are in a "zero touch state." In addition, the "zero touch state" means the state in which the clearance between the friction plates constituting the friction engagement element is reduced to nearly friction engagement. Accordingly, in the embodiment, the clearance between the friction plates constituting the second brake BR2 of the automatic transmission 20 is substantially zero. Therefore, in the embodiment, since the second brake BR2, which is a friction engagement element, is put in an engagement state by receiving only a small hydraulic pressure, the second brake BR2 can obtain extremely high responsiveness.

Next, the hydraulic pressure control circuit 14 of the hydraulic pressure control device according to the embodiment of the present invention will be described with reference to FIG. 4.

As illustrated in FIG. 4, the hydraulic pressure control circuit 14 has the five engagement hydraulic pressure control valves 16a to 16e, which are first to fifth engagement hydraulic pressure control valves, and the flow rate control valve 18, which controls the flow rates of hydraulic oil to be supplied to these engagement hydraulic pressure control valves 16a to 16e. The hydraulic pressure control circuit 14 further has a hydraulic pump 26 that supplies the hydraulic oil to the flow rate control valve 18 and an oil pan 28 that stores the hydraulic oil drawn by the hydraulic pump 26.

The hydraulic pump 26 draws in the hydraulic oil stored in the oil pan 28 and supplies the hydraulic oil to the flow rate control valve 18. The hydraulic oil for which the flow rate is regulated by the flow rate control valve 18 is supplied to the first engagement control valve 16a to the fifth engagement hydraulic pressure control valve 16e, respectively. In addition, the flow rate control valve 18 and the hydraulic pump 26 are controlled by the ECU 12 based on the detection signals from the ATF hot water temperature sensor 8 (FIG. 1) and the like and supply appropriate hydraulic pressures to the individual friction engagement elements.

Here, as illustrated in FIG. 4, the first engagement hydraulic pressure control valve 16a is connected to the first clutch CL1, which is the first friction engagement element 22a of the automatic transmission 20. In addition, the second engagement hydraulic pressure control valve 16b is connected to the second clutch CL2, which is the second friction engagement element 22b, and the third engagement hydraulic pressure control valve 16c is connected to the third clutch CL3, which is the third friction engagement element 22c. In addition, the fourth engagement hydraulic pressure control valve 16d is connected to the first brake BR1, which is the fourth friction engagement element 22d, and the fifth engagement hydraulic pressure control valve 16e is connected to the second brake BR2, which is the fifth friction engagement element 22e.

Accordingly, for example, when the first engagement hydraulic pressure control valve 16a is energized, the hydraulic pressure is supplied to the first clutch CL1, which is the first friction engagement element 22a of the automatic transmission 20 corresponding to the first engagement hydraulic pressure control valve 16a, and the first clutch CL1 is engaged. In addition, when the energization of the first engagement hydraulic pressure control valve 16a is stopped, the hydraulic pressure of the first clutch CL1 is released, the engagement is released, and the hydraulic oil is recovered to the oil pan 28 via the first engagement hydraulic pressure control valve 16a. As described above, the first to fifth friction engagement elements 22a to 22e can be engaged by energizing the first to fifth engagement hydraulic pressure control valves 16a to 16e corresponding to these friction engagement elements 22a to 22e, respectively. In addition, since the first to fifth friction engagement elements 22a to 22e have first to fifth engagement hydraulic pressure sensors 10a to 10e, the hydraulic pressures supplied to the friction engagement elements are detected.

Next, the structure and operation of the engagement hydraulic pressure control valves provided in the hydraulic pressure control device according to the embodiment of the present invention will be described with reference to FIGS. 5 to 9.

Figure 5:
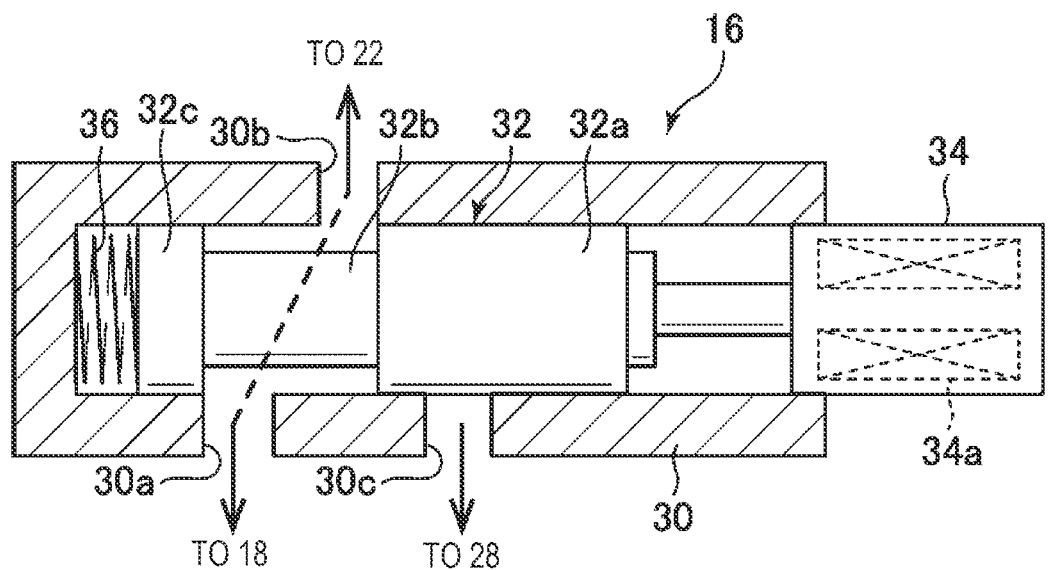
FIG. 5 is a sectional view illustrating an engagement hydraulic pressure control valve in the energized state in the hydraulic pressure control device according to the embodiment of the present invention.
Figure 6:
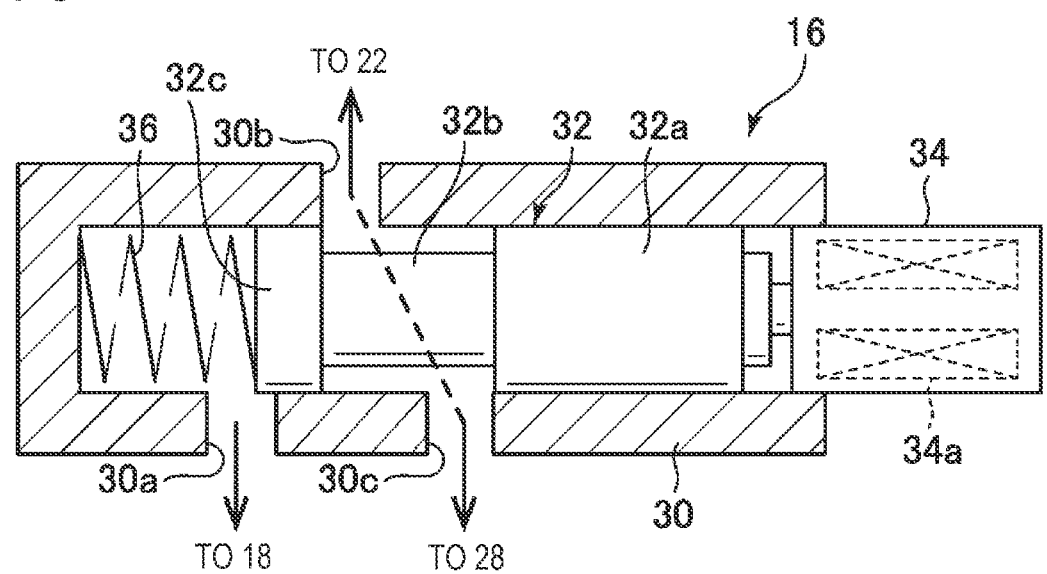
FIG. 6 is a sectional view illustrating the engagement hydraulic pressure control valve in the non-energized state in the hydraulic pressure control device according to the embodiment of the present invention.
Figure 7:
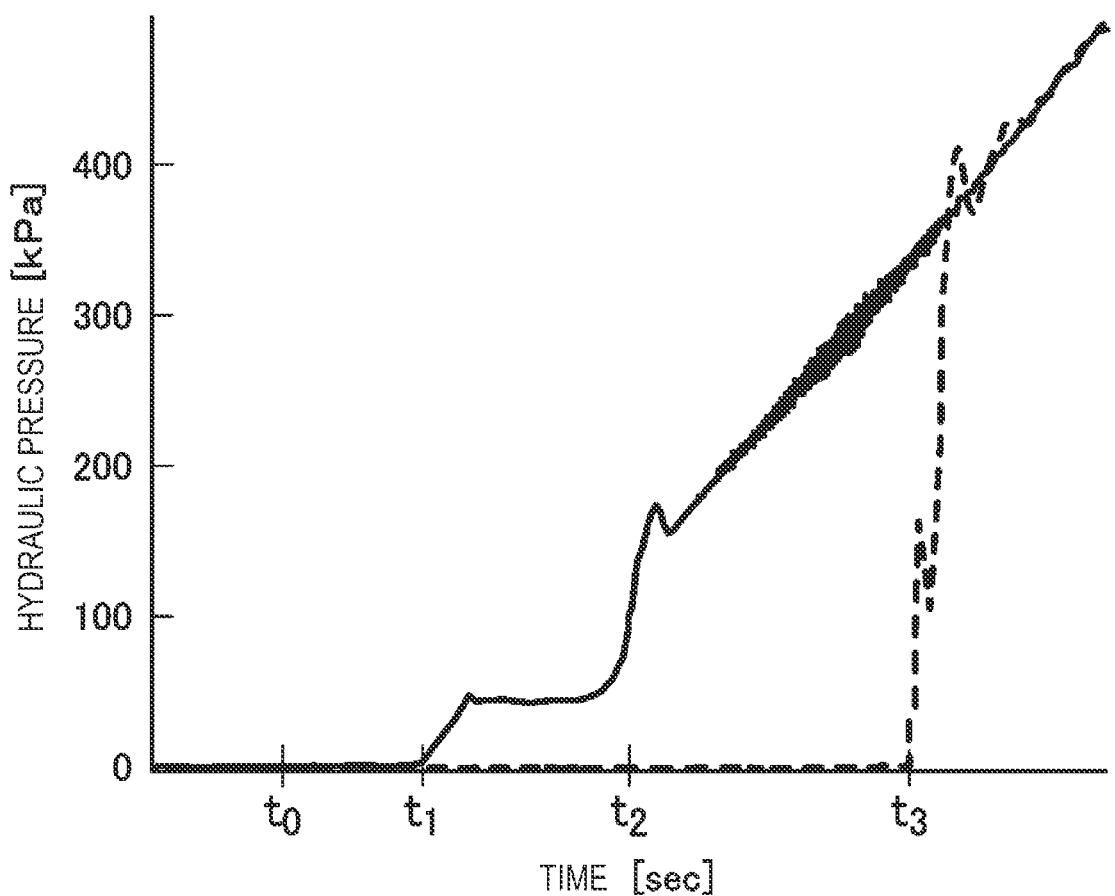
FIG. 7 is a graph illustrating an example of the operation of the engagement hydraulic pressure control valve when fixation occurs.
Figure 8:
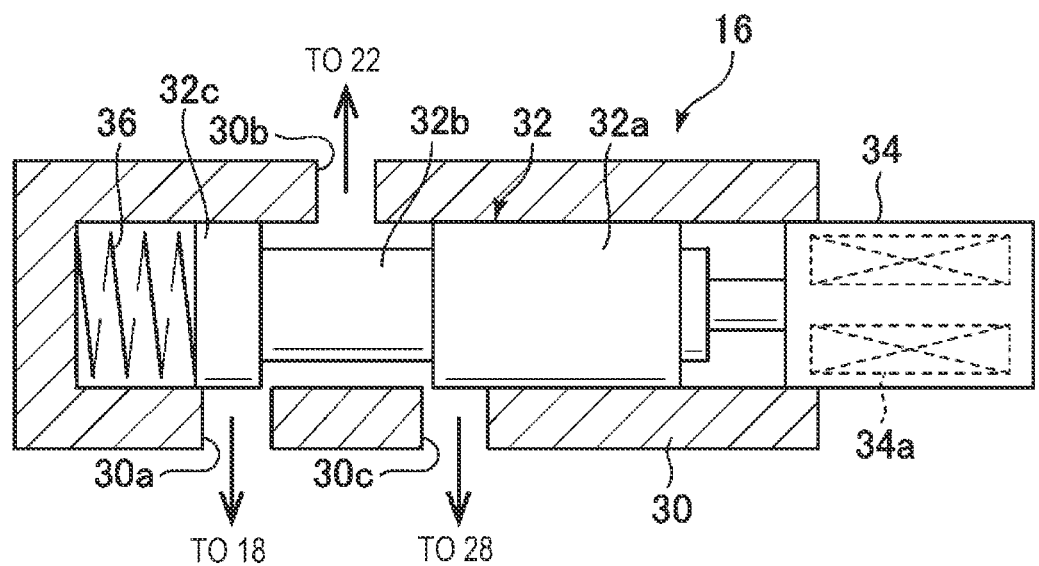
FIG. 8 is a sectional view illustrating the engagement hydraulic pressure control valve through which a predetermined fixation preventing current flows in the hydraulic pressure control device according to the embodiment of the present invention.
Figure 9:
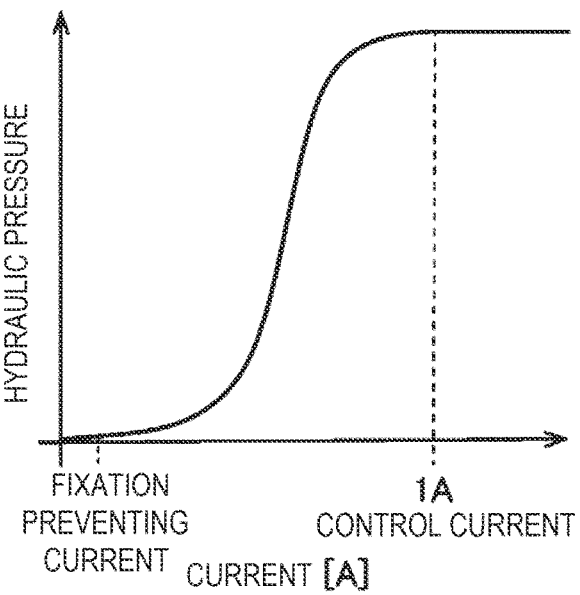
FIG. 9 is a graph illustrating the relationship between the current supplied to the engagement hydraulic pressure control valve and the hydraulic pressure to be supplied to friction engagement elements provided corresponding to this current in the hydraulic pressure control device according to the embodiment of the present invention.

FIG. 5 is a sectional view illustrating the engagement hydraulic pressure control valves 16 in the energized state. FIG. 6 is a sectional view illustrating the engagement hydraulic pressure control valves 16 in the non-energized state. FIG. 7 is a graph illustrating an example of the operation of the engagement hydraulic pressure control valves 16 when fixation occurs. FIG. 8 is a sectional view illustrating the engagement hydraulic pressure control valves 16 when a predetermined fixation preventing current is supplied. FIG. 9 is a graph illustrating the relationship between the current supplied to the engagement hydraulic pressure control valves 16 and the hydraulic pressure to be supplied to the friction engagement elements 22 corresponding to the engagement hydraulic pressure control valves 16.

As illustrated in FIG. 5, the engagement hydraulic pressure control valves 16 have a cylinder 30, a spool 32 that slides in the cylinder 30, and a solenoid valve 34 that drives this spool. It should be noted here that the hydraulic pressure control device according to the embodiment includes the first to fifth engagement hydraulic pressure control valves 16a to 16e and all of these engagement hydraulic pressure control valves have the same structure.

The cylinder 30 has a cylindrical shape with one end closed and the other end open. In addition, three ports 30a, 30b, and 30c are provided in the outer peripheral surface of the cylinder 30. The first port 30a is connected to the flow rate control valve 18, and the hydraulic oil flowing out of the flow rate control valve 18 flows into the cylinder 30 through the first port 30a. In addition, the second port 30b is connected to the corresponding friction engagement element 22. For example, the second port 30b of the cylinder 30 of the first engagement hydraulic pressure control valve 16a (FIG. 4) is connected to the hydraulic chamber F1 (FIG. 2) of the first clutch CL1 of the automatic transmission 20. In addition, the hydraulic oil in the cylinder 30 flows out through the third port 30c and the hydraulic oil having flowed out through the third port 30c is recovered to the oil pan 28.

The solenoid valve 34 slides the spool 32 in the cylinder 30 by passing a predetermined control current through a built-in coil 34a. That is, when the predetermined control current passes through the coil 34a of the solenoid valve 34, the spool 32 is moved to the position illustrated in FIG. 5 and the engagement hydraulic pressure control valve 16 is in the state in which the hydraulic pressure is supplied to the friction engagement elements 22. In contrast, when the predetermined control current does not pass through the coil 34a of the solenoid valve 34, the spool 32 is moved to the position illustrated in FIG. 6 and the engagement hydraulic pressure control valve 16 is in the state in which the hydraulic pressure is not supplied to the friction engagement elements 22. That is, the solenoid valve 34 is a normally closed solenoid in which the corresponding friction engagement elements 22 is switched to the engagement state when the predetermined control current is supplied and the friction engagement elements 22 is switched to the disengagement state when the control current is not supplied. The solenoid valve 34 is preferably a linear solenoid capable of finely controlling the amount of operation (movement distance of the spool 32) according to the amount of electricity supplied to the coil 34a.

The spool 32 is a stepped cylindrical component disposed slidably in the cylinder 30 and opens and closes the ports of the cylinder 30. In addition, a biasing spring 36 is disposed between the end of the spool 32 and the closed end portion of the cylinder 30. This biasing spring 36 is a coil spring disposed in the cylinder 30 and biases the spool 32 toward the open-end portion of the cylinder 30. Accordingly, when the coil 34a of the solenoid valve 34 is energized, the spool 32 is driven by the solenoid valve 34 to the position illustrated in FIG. 5 against the biasing force of the biasing spring 36. In contrast, when the energization of the coil 34a of the solenoid valve 34 is stopped, the spool 32 is moved to the position illustrated in FIG. 6 by the biasing force of the biasing spring 36.

In addition, the spool 32 has a first large diameter portion 32a, a small diameter portion 32b, and a second large diameter portion 32c in the order from the end and these large diameter portions have a diameter substantially the same as the inner diameter of the cylinder 30. Accordingly, the sliding of the spool 32 changes the connection state of the individual ports of the cylinder 30. That is, since the first port 30a and the second port 30b are aligned with the small diameter portion 32b of the spool 32 when the solenoid valve 34 illustrated in FIG. 5 is energized, the first port 30a communicates with the second port 30b. This supplies the hydraulic oil supplied from the flow rate control valve 18 to the corresponding friction engagement element 22 and switches the friction engagement elements 22 to the engagement state. On the other hand, the third port 30c is blocked by the second large diameter portion 32c.

In contrast, in the non-energized state of the solenoid valve 34 illustrated in FIG. 6, since the second port 30b and the third port 30c are aligned with the small diameter portion 32b of the spool 32, the second port 30b communicates with the third port 30c. Accordingly, the hydraulic oil in the friction engagement elements 22 flows out to the oil pan 28 via the cylinder 30 of the engagement hydraulic pressure control valves 16. On the other hand, the hydraulic oil having flowed out to the cylinder 30 via the first port 30a from the flow rate control valve 18 is blocked by the first large diameter portion 32a of the spool 32 and remains in the cylinder 30.

As described above, the engagement and disengagement of the individual friction engagement elements 22 are achieved by operating the corresponding engagement hydraulic pressure control valves 16 and switching between supply and non-supply of the hydraulic pressures to the friction engagement elements 22. The control device 12a built in the ECU 12 switches between engagement and disengagement of the friction engagement elements 22 corresponding to the engagement hydraulic pressure control valves 16 by passing the predetermined control current through the solenoid valves 34 of the engagement hydraulic pressure control valves 16.

However, when the control current does not pass through the solenoid valve 34 of the engagement hydraulic pressure control valves 16 for a long time, the spool 32 of the engagement hydraulic pressure control valves 16 may be fixed in the position illustrated in FIG. 6 within the cylinder 30. When the spool 32 is fixed as described above, switching between the engagement hydraulic pressure control valves 16 is not performed immediately even if the control device 12a passes the control current through the solenoid valve 34, thereby causing a delay in switching between the engagement hydraulic pressure control valves 16.

FIG. 7 is a graph illustrating an example of the behavior of the engagement hydraulic pressure control valve 16 when fixation occurs, and the horizontal axis represents the time and the vertical axis represents the hydraulic pressure supplied to the friction engagement elements 22 provided so as to correspond to the engagement hydraulic pressure control valves 16. In FIG. 7, the solid line represents changes in the hydraulic pressure of the normal engagement hydraulic pressure control valves 16 in which no fixation has occurred and the dotted line represents changes in the hydraulic pressure of the engagement hydraulic pressure control valves 16 in which fixation has occurred.

As illustrated by the solid line in FIG. 7, in the engagement hydraulic pressure control valve 16 in which no fixation has occurred, when the energization of the coil 34a of the solenoid valve 34 is started at time $t_0$, the hydraulic pressure starts increasing at time $t_1$, which is approximately 0.7 seconds later. Then, after becoming a constant value, the hydraulic pressure rises sharply again at time $t_2$. In contrast, the dotted line in FIG. 7 represents changes in the hydraulic pressure when the coil 34a of the engagement hydraulic pressure control valve 16 is not energized for approximately 1 hour and then the coil 34a is energized with the spool 32 of the engagement hydraulic pressure control valve 16 intentionally fixed.

As represented by the dotted line in FIG. 7, in the engagement hydraulic pressure control valve 16 in which fixation has occurred, the hydraulic pressure does not increase for a while after the energization of the coil 34a of the solenoid valve 34 is started at time $t_0$, and the hydraulic pressure starts increasing at time $t_3$, which is approximately 2.9 seconds after the start of energization at $t_0$. The behavior of the engagement hydraulic pressure control valve 16 illustrated in FIG. 7 is not based on the actual operating conditions of the automatic transmission 20. However, when fixation occurs in the spool 32 because the coil 34a is not energized for a long time, it has been found that a delay is caused in the supply of the hydraulic pressure to the friction engagement element 22. As described above, when fixation occurs in the engagement hydraulic pressure control valve 16, an increase in the hydraulic pressure of the corresponding friction engagement element 22 is delayed and the responsiveness of the automatic transmission 20 is reduced.

Accordingly, in the hydraulic pressure control device according to the embodiment, the control device 12a of the ECU 12 supplies a fixation preventing current less than the control current to the solenoid valve 34 corresponding to the friction engagement elements 22 in the disengagement state. That is, in the embodiment, as illustrated in FIG. 4, the first engagement hydraulic pressure control valve 16a is provided to correspond to the first friction engagement element 22a, the second engagement hydraulic pressure control valve 16b is provided to correspond to the second friction engagement element 22b, the third engagement hydraulic pressure control valve 16c is provided to correspond to the third friction engagement element 22c, and the fourth engagement hydraulic pressure control valve 16d is provided to correspond to the fourth friction engagement element 22d. When the first to fourth friction engagement elements 22a to 22d are in the disengagement state, the control device 12a supplies the fixation preventing current to the coils of the first to fourth engagement hydraulic pressure control valves 16a to 16d corresponding to these friction engagement elements 22a to 22d.

However, the control device 12a does not supply the fixation preventing current to the fifth engagement hydraulic pressure control valve 16e corresponding to the fifth friction engagement element 22e. This is because the second brake BR2, which is the fifth friction engagement element 22e, is configured as a "zero touch clutch" and the clearance between the friction plates is set to substantially zero, as described above. That is, when the fixation preventing current is supplied to the coil of the fifth engagement hydraulic pressure control valve 16e corresponding to the "zero touch clutch" in which the clearance between the friction plates is set to substantially zero, the clutch may be engaged unexpectedly. Accordingly, the fixation preventing current is not supplied to the coil of the fifth engagement hydraulic pressure control valve 16e corresponding to the fifth friction engagement element 22e, which is the "zero touch clutch."

FIG. 8 is a sectional view illustrating the state in which the fixation preventing current is supplied to the coil 34a of the engagement hydraulic pressure control valve 16.

As illustrated in FIG. 8, when the fixation preventing current is supplied to the coil 34a of the solenoid valve 34 provided in the engagement hydraulic pressure control valve 16, the spool 32 is moved a predetermined distance by the solenoid valve 34. Here, when a predetermined "control current" is supplied to the coil 34a of the solenoid valve 34, the spool 32 moves from the state illustrated in FIG. 6 to the state illustrated in FIG. 5. On the other hand, since the "fixation preventing current" is lower than the "control current", the driving force for the spool 32 is smaller and, as illustrated in FIG. 8, when "fixation preventing current" is supplied, the spool 32 is moved to a position between the position illustrated in FIG. 6 and the position illustrated in FIG. 5. In the state illustrated in FIG. 8, the second port 30b of the cylinder 30 is opened and the first port 30a and the third port 30c are also slightly opened.

Next, the relationship between the current supplied to the coil 34a of the engagement hydraulic pressure control valves 16 and the hydraulic pressure supplied to the friction engagement elements 22 corresponding to the engagement hydraulic pressure control valves 16 will be described with reference to FIG. 9. As described above, when the "control current" is supplied to the coil 34a of the solenoid valve 34 of the engagement hydraulic pressure control valves 16, the spool 32 is moved to the state illustrated in FIG. 5. In this state, since the first port 30a and the second port 30b of the cylinder 30 are fully opened, the hydraulic pressure from the flow rate control valve 18 is sufficiently supplied to the corresponding friction engagement elements 22 and the friction engagement elements 22 are switched to the engagement state. As illustrated in FIG. 9, in the embodiment, the control current for the engagement hydraulic pressure control valves 16 is approximately 1 A.

In contrast, in the embodiment, the "fixation preventing current" supplied to the coil 34a of the engagement hydraulic pressure control valves 16 is set to approximately 0.1 A, which is lower than the "control current." As described above, when the "fixation preventing current" is supplied to the coil 34a of the solenoid valve 34 of the engagement hydraulic pressure control valves 16, the spool 32 of the engagement hydraulic pressure control valves 16 is moved to the state illustrated in FIG. 8. In the state illustrated in FIG. 8, since the first port 30a connected to the flow rate control valve 18 is slightly opened, a small hydraulic pressure is also generated in the corresponding friction engagement elements 22 connected to the second port 30b. As illustrated in FIG. 9, when the fixation preventing current is passed through the coil 34a of the solenoid valve 34, the hydraulic pressure generated in the corresponding friction engagement elements 22 is small. Accordingly, the friction engagement elements 22 are not engaged. However, since a small amount of hydraulic oil flows into the cylinder 30 when the fixation preventing current is passed through the coil 34a, a thin oil film is formed between the cylinder 30 and the spool 32, thereby suppressing the occurrence of fixation of the spool 32.

Next, the operation of the hydraulic pressure control device according to the embodiment of the present invention will be described with reference to FIG. 10.

Figure 10:
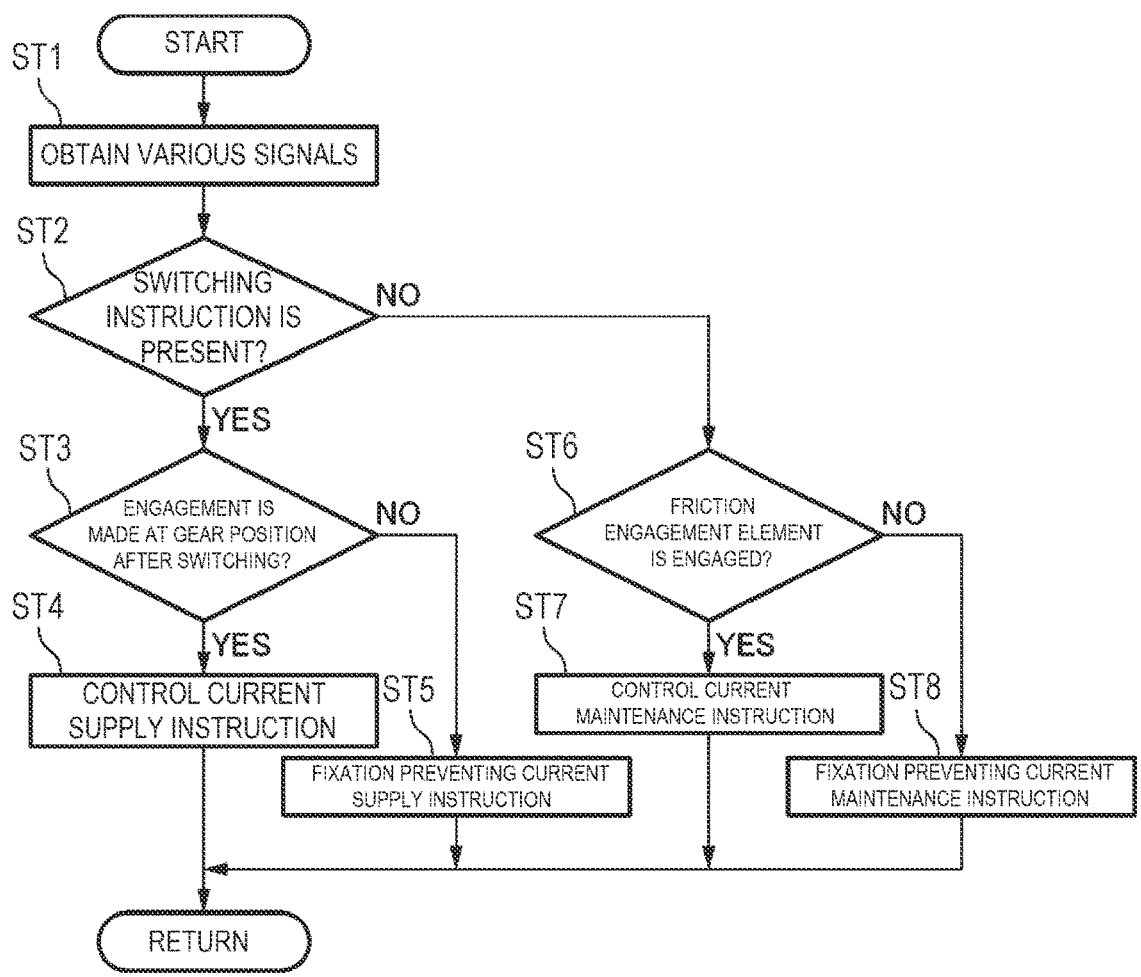
FIG. 10 is a flowchart illustrating the processing performed by the control device of an electronic control unit (ECU) in the hydraulic pressure control device according to the embodiment of the present invention.

FIG. 10 is a flowchart illustrating the processing performed by the control device 12a of the ECU 12 in the hydraulic pressure control device according to the embodiment of the present invention. It should be noted here that the processing of the flowchart illustrated in FIG. 10 is executed each time a gear shift is performed in the automatic transmission 20. In addition, the flowchart in FIG. 10 represents the processing for setting the current value to be supplied to the coil 34a of the solenoid valve 34 of the engagement hydraulic pressure control valves 16. It should be noted here that the flowchart illustrated in FIG. 10 is executed for each of the first engagement hydraulic pressure control valve 16a to the fourth engagement hydraulic pressure control valve 16d and the current values to be supplied to the individual coils 34a are set. In contrast, the processing of the flowchart in FIG. 10 is not applied to the control of the fifth engagement hydraulic pressure control valve 16e corresponding to the fifth friction engagement element 22e, which is a "zero touch clutch."

Next, the processing of the flowchart in FIG. 10 will be described. The following describes, as an example, the control of the third engagement hydraulic pressure control valve 16c corresponding to the third friction engagement element 22c, which is the third clutch CL3. It should be noted here that the current values supplied to the coils 34a are set based on the same flowchart as in FIG. 10 for the first engagement hydraulic pressure control valve 16a, the second engagement hydraulic pressure control valve 16b, and the fourth engagement hydraulic pressure control valve 16d.

First, in step ST1 in FIG. 10, various signals are read by the control device 12a of the ECU 12. The signals read in step ST1 include the signal concerning the gear positions of the automatic transmission 20 and the detection signal from the engagement hydraulic pressure sensor 10 (here, the detection signal from the third engagement hydraulic pressure sensor 10c provided so as to correspond to the third friction engagement element 22c).

Next, in step ST2, the presence or absence of a switching instruction is determined. For example, in step ST1, when an instruction signal for switching the gear position of the automatic transmission 20 from the first position to the second position is obtained, it is determined that there is no switching instruction. That is, since the third friction engagement element 22c, which is the third clutch CL3, remains unengaged in a gear shift from the first position to the second position as illustrated in FIG. 3, "no switching instruction is present" is determined in step ST2. In contrast, since the third friction engagement element 22c is switched from the disengagement state to the engagement state as illustrated in FIG. 3 when an instruction signal for switching the gear position from the third position to the fourth position is obtained, "a switching instruction is present" is determined in step ST2.

When "no switching instruction is present" is determined in step ST2, the processing proceeds to step ST6 and it is determined in step ST6 whether the friction engagement element is being engaged. Whether the friction engagement element is being engaged is determined based on the detection signal from the engagement hydraulic pressure sensor 10. For example, whether the third friction engagement element 22c is being engaged is determined based on the detection signal from the third engagement hydraulic pressure sensor 10c and, when the detection value is equal to or higher than a predetermined pressure, it is determined that the third friction engagement element 22c is being engaged. In contrast, when the detection value from the third engagement hydraulic pressure sensor 10c is lower than the predetermined pressure, it is determined that the third friction engagement element 22c is not being engaged.

For example, when it is determined in step ST6 that the current gear position of the automatic transmission 20 is the fourth position, since the third friction engagement element 22c is supplied with the hydraulic pressure for engagement (see FIG. 3), the detection value from the third engagement hydraulic pressure sensor 10c is equal to or higher than the predetermined pressure and the processing proceeds to step ST7.

Next, in step ST7, the supply of the predetermined control current for engaging the third friction engagement element 22c is maintained and the flowchart illustrated in FIG. 10 has been executed once. That is, to maintain the engagement state of the third friction engagement element 22c, the supply of the predetermined control current to the coil 34a of the solenoid valve 34 of the third engagement hydraulic pressure control valve 16c corresponding to the third friction engagement element 22c is maintained.

In contrast, when it is determined in step ST6 that the current gear position of the automatic transmission 20 is, for example, the second position, since the third friction engagement element 22c is not supplied with the hydraulic pressure for engagement (see FIG. 3), the detection value from the third engagement hydraulic pressure sensor 10c is less than the predetermined pressure and the processing proceeds to step ST8.

Next, in step ST8, the control current for engaging the third friction engagement element 22c is not supplied, the supply of the fixation preventing current to the third engagement hydraulic pressure control valve 16c is maintained, and the flowchart illustrated in FIG. 10 has been executed once. That is, when the disengagement state continues for a long time, the spool 32 of the third engagement hydraulic pressure control valve 16c may be fixed. Accordingly, the third friction engagement element 22c is maintained in the disengagement state, but the fixation preventing current is continuously supplied to the coil 34a of the solenoid valve 34 of the third engagement hydraulic pressure control valve 16c to prevent the spool 32 of the third engagement hydraulic pressure control valve 16c from being fixed.

Since the fixation preventing current is lower than the control current for engaging the friction engagement element as described above, even when the fixation preventing current is supplied to the coil 34a of the third engagement hydraulic pressure control valve 16c, the third friction engagement element 22c is not engaged. That is, the spool 32 of the third engagement hydraulic pressure control valve 16c remains in the state illustrated in FIG. 8 and a hydraulic pressure that is too small to engage the third friction engagement element 22c is generated in the third friction engagement element 22c. As described above, the solenoid valve 34 corresponding to the friction engagement element 22 in the disengagement state is supplied with the fixation preventing current lower than the control current. It should be noted here that, when the fixation preventing current is supplied to the solenoid valve 34, a hydraulic pressure that is too small to engage the friction engagement element is generated in the friction engagement element. This state is also referred to as the state of "non-supply of a hydraulic pressure" in this specification.

In contrast, when it is determined in step ST2 that "a switching instruction is present", the processing proceeds to step ST3 and it is determined in step ST3 whether the friction engagement element is engaged at the gear position after switching. For example, when the instruction signal for switching the gear position of the automatic transmission 20 from the third position to the fourth position is obtained in step ST1, it is determined in step ST3 that the friction engagement element is engaged at the gear position after switching. That is, since the third friction engagement element 22c, which is the third clutch CL3, is put in the engagement state after switching when a gear shift from the third position to the fourth position as illustrated in FIG. 3 is performed, it is determined in step ST3 that the third friction engagement element 22c is engaged at the gear position after switching.

When it is determined in step ST3 that the friction engagement element is engaged in the gear position after switching, the processing proceeds to step ST4 and the supply of the control current to the friction engagement element is started here. For example, when a gear shift from the third position to the fourth position is performed, the supply of the predetermined control current is started to the coil 34a of the solenoid valve 34 of the third engagement hydraulic pressure control valve 16c corresponding to the third friction engagement element 22c. This supplies the hydraulic pressure to the third friction engagement element 22c and engages the third friction engagement element 22c, and the flowchart illustrated in FIG. 10 has been executed once.

In contrast, when it is determined in step ST3 that the friction engagement element is disengaged in the gear position after switching, the processing proceeds to step ST5 and the supply of the fixation preventing current to the friction engagement element is started here. For example, when a gear shift from the fourth position to the third position is performed, the supply of the fixation preventing current to the coil 34a of the solenoid valve 34 of the third engagement hydraulic pressure control valve 16c corresponding to the third friction engagement element 22c is started and the flowchart illustrated in FIG. 10 has been performed once. Since a hydraulic pressure large enough to engage the third friction engagement element 22c is not generated when the third engagement hydraulic pressure control valve 16c is supplied with the fixation preventing current, the third friction engagement element 22c is put in the disengagement state.

The operation of the hydraulic pressure control device according to the embodiment of the present invention has been described above by using, as an example, the control of the third engagement hydraulic pressure control valve 16c corresponding to the third friction engagement element 22c, but this is also true of the control for the first, second, and fourth engagement hydraulic pressure control valves 16a, 16b, and 16d.

In contrast, the flowchart illustrated in FIG. 10 is not applied to the control of the fifth engagement hydraulic pressure control valve 16e corresponding to the fifth friction engagement element 22e (second brake BR2), which is a zero touch clutch. That is, the coil 34a of the solenoid valve 34 provided in the fifth engagement hydraulic pressure control valve 16e is not supplied with the fixation preventing current even when the fifth friction engagement element 22e is in the disengagement state. Accordingly, the coil 34a of the fifth engagement hydraulic pressure control valve 16e is supplied with the control current when the fifth friction engagement element 22e is put in the engagement state and the current is set to zero when the fifth friction engagement element 22e is put in the disengagement state. That is, since the fifth friction engagement element 22e is a zero touch clutch and the clearance between the friction plates is set to substantially zero, even when the fixation preventing current lower than the predetermined control current is supplied, the fifth friction engagement element 22e may be engaged. Accordingly, in the embodiment, the fixation preventing current is not supplied to the solenoid valve 34 of the engagement hydraulic pressure control valve 16 corresponding to a zero touch clutch.

As illustrated in FIG. 3, at the starting (the first position or the reverse position) of the vehicle, the fifth friction engagement element 22e (second brake BR2), which is a zero touch clutch, is supplied with the hydraulic pressure and put in the engagement state by switching to the fifth engagement hydraulic pressure control valve 16e corresponding to the fifth friction engagement element 22e. By using a zero touch clutch as the friction engagement element to be engaged at the starting of the vehicle as described above, the starting responsiveness of the vehicle can be improved. In addition, the fifth friction engagement element 22e (second brake BR2) is always in the engagement state at a gear position equal to or lower than the fifth position, including the gear positions (first and reverse positions) used at the start. Since the situation in which only a gear position equal to or higher than the sixth gear position is used for a long time is difficult to imagine in a normal travel of the vehicle, the fifth friction engagement element 22e seldom remains in the disengagement state for a long time. Accordingly, even if the fixation preventing current is not supplied to the fifth engagement hydraulic control valve 16e corresponding to the fifth friction engagement element 22e, the risk of fixation thereof is extremely small.

In the hydraulic pressure control device according to the embodiment of the present invention, the control device 12a supplies the fixation preventing current lower than the control current to at least one of the solenoid valves 34 corresponding to the friction engagement elements 22 in the disengagement state (steps ST5 and ST8 in FIG. 10), thereby suppressing the occurrence of fixation. That is, when the fixation preventing current lower than the control current is supplied to the solenoid valve 34, a hydraulic pressure is generated in the friction engagement elements 22 corresponding to the solenoid valve 34. However, since the fixation preventing current is less than the control current, the hydraulic pressure generated in the corresponding friction engagement elements 22 is small, the friction engagement elements 22 are not engaged, and the disengagement state is maintained. In contrast, since a small amount of hydraulic oil flows through the hydraulic supply system of the solenoid valve 34 to which the fixation preventing current is supplied, the fixation of the spool 32 moved by the solenoid valve 34 is suppressed, thereby suppressing the occurrence of the delay in the supply of the hydraulic pressure.

In addition, in the hydraulic pressure control device according to the embodiment, when the solenoid valve 34 is supplied with the control current, the corresponding friction engagement elements 22 is supplied with the hydraulic pressure and put in the engagement state, so the friction engagement elements 22 can be switched to the disengagement state without supplying the current to the solenoid valve 34, thereby reducing the current consumption. In addition, it is sufficient to pass a small current slightly higher than zero as the fixation preventing current, so the amount of current consumed to suppress fixation can be reduced.

Furthermore, in the hydraulic pressure control device according to the embodiment, since the solenoid valve 34 of the fifth engagement hydraulic pressure control valve 16e corresponding to the fifth friction engagement element 22e, which is a zero touch clutch is not supplied with the fixation preventing current, malfunction of the zero touch clutch due to the fixation preventing current can be prevented.

In addition, in the hydraulic pressure control device according to the embodiment, since the fifth friction engagement element 22e, which is a zero touch clutch, is always engaged at a gear position equal to or lower than the fifth position (FIG. 3), which is the predetermined gear position of automatic transmission 20, the fifth friction engagement element 22e is not disengaged for a long time during a normal travel and the occurrence of fixation can be suppressed even if the fixation preventing current is not supplied to the solenoid valve 34 corresponding to the zero touch clutch.

The embodiment of the present invention has been described above, but various changes can be made to the embodiment described above. In particular, the present invention is applied to an automatic transmission having six clutches including a zero touch clutch and two brakes in the embodiment described above, but the present invention can be applied to an automatic transmission of any form.

In addition, the embodiment described above adopts, as the solenoid valve 34 provided in the engagement hydraulic pressure control valves 16, a normally closed solenoid that engages the friction engagement elements 22 by supplying the hydraulic pressure when the control current is supplied. In contrast, a modification may adopt a normally open solenoid that engages the friction engagement elements 22 by supplying the hydraulic pressure when the supply of the control current is stopped. In this case, the control current to the solenoid valve is stopped (current=0) when hydraulic pressure is supplied to the friction engagement elements 22, and predetermined control current is supplied to the solenoid valve when the supply of hydraulic pressure to the friction engagement elements 22 is stopped. In addition, a current less than the control current is supplied as the fixation preventing current. In addition, normally closed solenoids and normally open solenoids can be mixed in the hydraulic pressure control circuit.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: automatic transmission system
2: vehicle speed sensor
4: throttle opening sensor
6: turbine revolutions sensor
8: ATF hot water temperature sensor
10: engagement hydraulic pressure sensor
12: ECU
12a: control device
14: hydraulic pressure control circuit
16: engagement hydraulic pressure control valve
18: flow rate control valve
20: automatic transmission
20a: transmission case
20b: input shaft
20c: output shaft
22: friction engagement element
24a: power transfer member
24b: power transfer member
24c: power transfer member
24d: power transfer member
24e: power transfer member
24f: power transfer member
24g: power transfer member
24h: power transfer member
26: hydraulic pump
28: oil pan
30: cylinder
30a: first port
30b: second port
30c: third port
32: spool
32a: first large diameter portion 32b: small diameter portion
32c: second large diameter portion
34: solenoid valve
34a: coil
36: biasing spring

The invention claimed is:

1. A hydraulic pressure control device for an automatic transmission that performs a gear shift by switching between engagement and disengagement of a plurality of friction engagement elements, the hydraulic pressure control device comprising:
a plurality of solenoid valves configured to switch between engagement and disengagement of the friction engagement elements by switching between supply and non-supply of hydraulic pressures to the friction engagement elements, the solenoid valves being provided corresponding to the friction engagement elements, respectively; and
a control device configured to switch between supply and non-supply of the hydraulic pressures to the friction engagement elements by supplying a predetermined control current to the solenoid valves, wherein
the control device supplies a fixation preventing current lower than the control current to at least one of the solenoid valves in a disengagement state of the friction engagement elements,
when it is determined that no switching instruction is present, it is determined whether the friction engagement elements are being engaged, and whether the friction engagement elements are being engaged is determined based on a detection signal from an engagement hydraulic pressure sensor,
when it is determined that the friction engagement elements are engaged, the supply of the predetermined control current for engaging the friction engagement elements is maintained, and
when it is determined that the friction engagement elements are not engaged, the control current for engaging the friction engagement elements is not supplied, the supply of the fixation preventing current to an engagement hydraulic pressure control valve is maintained.

2. The hydraulic pressure control device according to claim 1,
wherein at least one of the solenoid valves switches at least one of the friction engagement elements to an engagement state when receiving the control current.

3. The hydraulic pressure control device according to claim 2,
wherein at least one of the friction engagement elements is at least one zero touch clutch in which a clearance between friction plates constituting each of the friction engagement elements is substantially zero, and the control device does not supply the fixation preventing current to at least one of the solenoid valves corresponding to the at least one zero touch clutch even when the at least one zero touch clutch is in the disengagement state.

4. The hydraulic pressure control device according to claim 3,
wherein the control device supplies the hydraulic pressures to the at least one zero touch clutch by switching the solenoid valves corresponding to the at least one zero touch clutch when a vehicle equipped with the automatic transmission starts, and the at least one zero touch clutch is always switched to the engagement state at a gear position equal to or lower than a predetermined gear position of the automatic transmission.

5. The hydraulic pressure control device according to claim 1,
wherein at least one of the friction engagement elements is at least one zero touch clutch in which a clearance between friction plates constituting each of the friction engagement elements is substantially zero, and the control device does not supply the fixation preventing current to at least one of the solenoid valves corresponding to the at least one zero touch clutch even when the zero touch clutch is in the disengagement state.

6. The hydraulic pressure control device according to claim 5,
wherein the control device supplies the hydraulic pressures to the at least one zero touch clutch by switching the solenoid valves corresponding to the at least one zero touch clutch when a vehicle equipped with the automatic transmission starts, and the at least one zero touch clutch is always switched to the engagement state at a gear position equal to or lower than a predetermined gear position of the automatic transmission.

7. The hydraulic pressure control device according to claim 1, wherein
when it is determined that the friction engagement elements are to be engaged in the gear position after switching, then the supply of the control current to the friction engagement elements is started, and
when it is determined that the friction engagement elements are to be disengaged in the gear position after switching, then the supply of the fixation preventing current to the friction engagement elements is started.

8. A hydraulic pressure control device for an automatic transmission that performs a gear shift by switching between engagement and disengagement of a plurality of friction engagement elements, the hydraulic pressure control device comprising:
a plurality of solenoid valves configured to switch between engagement and disengagement of the friction engagement elements by switching between supply and non-supply of hydraulic pressures to the friction engagement elements, the solenoid valves being provided corresponding to the friction engagement elements, respectively; and
a control device configured to switch between supply and non-supply of the hydraulic pressures to the friction engagement elements by supplying a predetermined control current to the solenoid valves, wherein
the control device supplies a fixation preventing current lower than the control current to at least one of the solenoid valves in a disengagement state of the friction engagement elements, and
at least one of the friction engagement elements is at least one zero touch clutch in which a clearance between friction plates constituting each of the friction engagement elements is substantially zero, and the control device does not supply the fixation preventing current to at least one of the solenoid valves corresponding to the at least one zero touch clutch even when the at least one zero touch clutch is in the disengagement state.

9. The hydraulic pressure control device according to claim 8,
wherein the control device supplies the hydraulic pressures to the at least one zero touch clutch by switching the solenoid valves corresponding to the at least one zero touch clutch when a vehicle equipped with the automatic transmission starts, and the at least one zero touch clutch is always switched to an engagement state at a gear position equal to or lower than a predetermined gear position of the automatic transmission.

10. The hydraulic pressure control device according to claim 8, wherein when it is determined that the friction engagement elements are to be engaged in a gear position after switching, then the supply of the control current to the friction engagement elements is started, and when it is determined that the friction engagement elements are to be disengaged in the gear position after switching, then the supply of the fixation preventing current to the friction engagement elements is started.

* * * * *